United States Patent
Yun et al.

(10) Patent No.: US 6,473,195 B1
(45) Date of Patent: Oct. 29, 2002

(54) IMAGE FORMING APPARATUS AND VIDEO DATA TRANSMITTING METHOD THEREFOR

(75) Inventors: Jin-su Yun; Yong-Geun Kim, both of Suwon (KR)

(73) Assignee: Samsung Electronics Co., Ltd., Kyungki-Do (KR)

( * ) Notice: Subject to any disclaimer, the term of this patent is extended or adjusted under 35 U.S.C. 154(b) by 0 days.

(21) Appl. No.: 09/475,036

(22) Filed: Dec. 30, 1999

(30) Foreign Application Priority Data

Dec. 31, 1998 (KR) ............................................ 98-63156

(51) Int. Cl.[7] .............................................. G06K 15/00
(52) U.S. Cl. ....................................... 358/1.17; 358/1.4
(58) Field of Search ........................ 358/1.1, 1.4, 1.13, 358/1.14, 1.16, 1.17, 1.18, 296, 404, 444, 540; 345/530, 536, 537, 538, 544, 545, 546; 710/52, 53, 74

(56) References Cited

U.S. PATENT DOCUMENTS 6,226,099 B1 * 5/2001 Sugaya ...................... 358/1.15
6,369,910 B1 * 4/2002 Mitani ....................... 358/1.13

* cited by examiner

*Primary Examiner*—Arthur G. Evans
(74) *Attorney, Agent, or Firm*—Sughrue Mion, PLLC

(57) ABSTRACT

An image forming apparatus includes an engine for forming an image corresponding to received video data on a sheet of paper, a main frame buffer memory, an auxiliary frame buffer memory for outputting stored video data along a data transmission path to the engine according to a video clock sync signal, and a first signal when a lower level correspondingly set to at least some amount of the stored video data is reached and a second signal when the stored data reaches a set upper level. This image forming apparatus further comprises a central processing unit for converting print data received externally to video data suitable for driving of the engine and storing the converted video data in the main frame buffer memory, and a direct memory access controller for controlling the main frame buffer memory so that video data stored in the main frame buffer memory is transmitted to the auxiliary frame buffer memory until the second signal is output when a print start signal is input, at an initial stage, and the video data stored in the main frame buffer memory is transmitted to the auxiliary frame buffer memory as much as a set data transmission amount whenever the first signal is input, at a subsequent stage after the initial stage. Also provided is a video sync signal controller for controlling operation and interruption of the direct memory access controller according to a video data output control signal output from the engine and outputting the video clock sync signal. Thus, as the video data can be continuously output to the engine in synchronization with the video clock signal until the print stop signal is generated, speed of print can be increased. Further, a large capacity of storing video data for a memory for video data transmission is not needed.

12 Claims, 6 Drawing Sheets

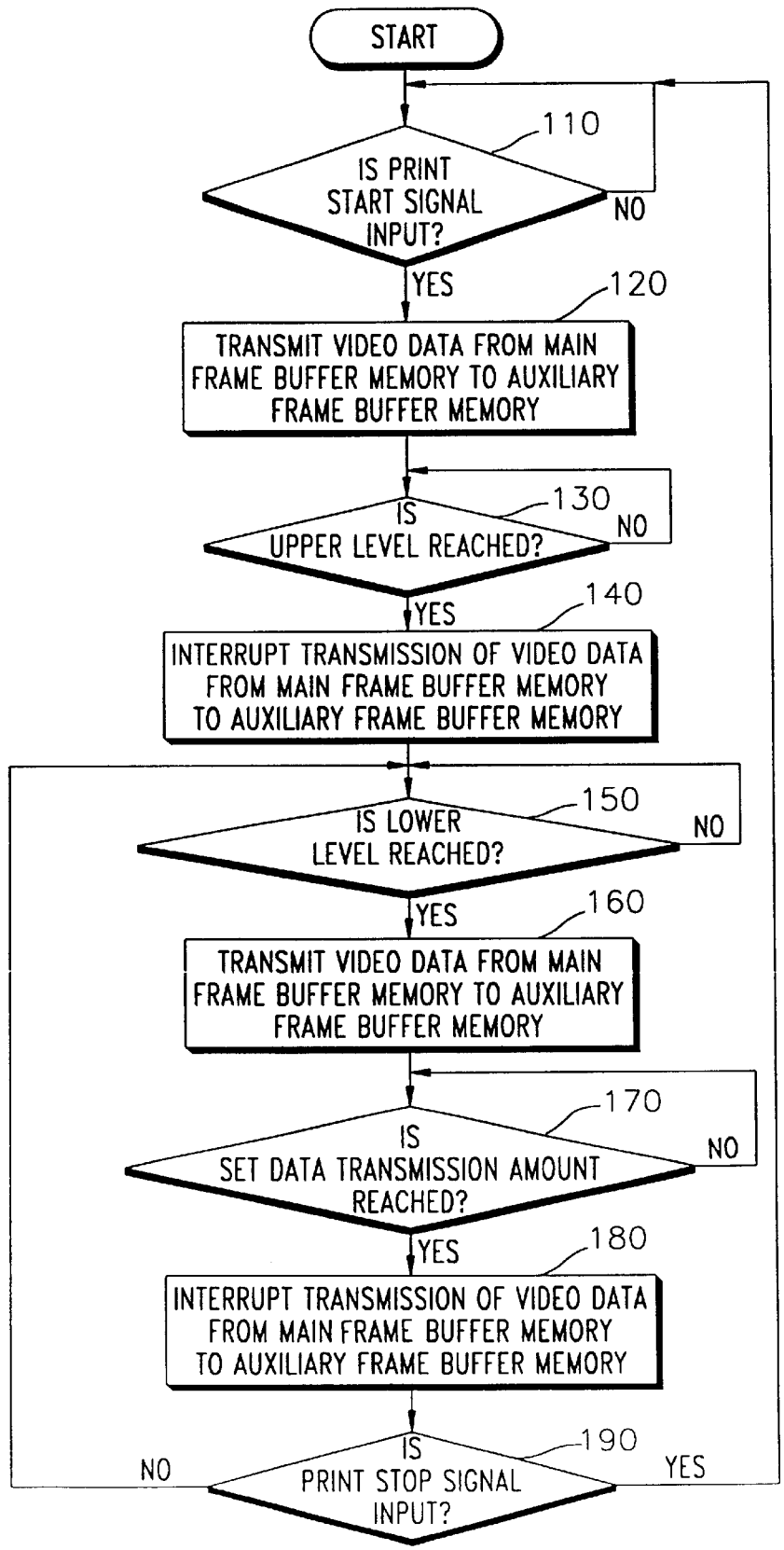

IMAGE FORMING APPARATUS AND VIDEO DATA TRANSMITTING METHOD THEREFOR

BACKGROUND OF THE INVENTION

1. Field of the Invention

The present invention relates to an image forming apparatus for preventing the delay in transmission of video data to an engine, and to a video data transmitting method therefor.

2. Description of the Related Art

An image forming apparatus such as a printer or a copier forms an image corresponding to received print data on a sheet of paper. A printer receives print data from a computer connected to the printer through a communications interface while the copier receives print data from a scanner scanning an object to be copied.

FIG. 1 is a view showing the structure of a conventional image forming apparatus. Referring to the drawing, the image forming apparatus includes a central processing unit (CPU) 11, a main frame buffer memory 12, a direct memory access (DMA) controller 13, a video data output controller 14, a video sync signal controller 15, and an engine 16.

The CPU 11 converts print data received from the outside to video data suitable for driving the engine 16 and stores the converted video data in the main frame buffer memory 12.

The engine 16 is configured to print and output an image corresponding to the received video data in a sheet of paper. To enable the engine 16 to begin an image print task using a sheet of paper, each of parts the constituting the engine 16 should be in a ready mode to perform the print task. When receiving a print command from the CPU 11, the engine 16 requires has each part to be ready to perform the print task. That is, a rotary polygonal mirror or a scan disk (a disk where a holographic pattern for deflecting input light is formed), which are deflection devices in a laser scanning unit, is rotated to set speeds required for performing the print task, a transfer device is heated to a set temperature, or each part is checked whether there is any problem in performing the print task. When the preparation of performing the print task is completed, the engine 16 outputs a print start signal for indicating that it is possible to start the print task to the video sync signal controller 15.

The DMA controller 13 controls the main frame buffer memory 12 such that the video data stored in the main frame buffer memory 12 can be output to the video data output controller 14 when a print start signal is output from the video sync signal controller 15 from the engine 16.

The video data output controller 14 temporarily stores the video data received from the main frame buffer memory 12 and outputs the video data to the engine 16 by being controlled by the video sync signal controller 15.

The video sync signal controller 15 controls the operation of the DMA controller 13 and the time when the video data is output from the video data output controller 14 according to a video data output control signal output from the engine 16. The video data output control signal output from the engine 16 includes a print start signal, a print stop signal, and a video clock sync signal. The print stop signal is generated from the engine 16 when the video data corresponding to a single page and/or file is completely written to a photoreceptor medium. The video clock sync signal is output from a video clock generator (not shown) provided in the engine 16 for recording of the video data on the photoreceptor medium according to a position a pixel.

The video data output controller 14 outputs the video data to the engine 16 by synchronizing the same with the video clock signal output from the video sync signal controller 15.

In a method for transmitting video data from the main buffer memory 12 to the video data output controller 14 in the conventional image forming apparatus, as shown in FIG. 2, when a print start signal is output from the video sync controller 15, a main frame buffer memory access controller 13a of the DMA controller 13 controls output of video data from the main frame buffer memory 12 so that the video data stored in the main frame buffer memory 12 is transmitted to the video data output controller 14. When the video data transmitted from the main frame buffer memory 14 completely fills an inner memory, the video data output controller 14 outputs a FF (full flag) signal indicating that the data is full. When the FF signal is input, the main frame buffer memory access controller 13a stops transmission of the video data from the main frame buffer memory 12 to the video data output controller 14. Also, when the stored video data is all output to the engine 16 and no video data is left, the video data output controller 14 outputs an empty signal to the main frame buffer memory access controller 13a. Then, the main frame buffer memory access controller 13a controls again the transmission of the video data until the video data output controller 14 is completely filled with the video data stored in the main frame buffer memory 12.

In the above conventional video data transmission method, a delay in time between the point when the video data is received from the main frame buffer memory 12 and the point when the empty signal is output from the video data output controller 14 is generated. As a result, when a high speed printing is performed, the time delay until the video data is received after the video data in the video data output controller 14 is emptied, lowers the entire print time.

SUMMARY OF THE INVENTION

To solve the above problem, it is an objective of the present invention to provide an image forming apparatus which can present a time delay in the transmission of video data to an engine and a video data transmitting method therefor.

Accordingly, to achieve the above objective, there is provided an image forming apparatus which comprises an engine for forming an image corresponding to received video data on a sheet of paper, a main frame buffer memory, an auxiliary frame buffer memory for outputting stored video data along a data transmission path to the engine according to a video clock sync signal, and a first signal when a lower level correspondingly set to at least some amount of the stored video data is reached, and a second signal when the stored data reaches a set upper level. The apparatus further comprises a central processing unit for converting print data received externally to video data suitable for driving of the engine and storing the converted video data in the main frame buffer memory and a direct memory access controller for controlling the main frame buffer memory so that video data stored in the main frame buffer memory is transmitted to the auxiliary frame buffer memory until the second signal is output when a print start signal is input, at an initial stage, and the video data stored in the main frame buffer memory is transmitted to the auxiliary frame buffer memory as much as a set data transmission amount whenever the first signal is input, at a subsequent stage after the initial stage. There is also provided a video sync signal controller for controlling operation and interruption of the direct memory access controller according to a video data output control signal output from the engine and outputting the video clock sync signal.

It is preferred in the present invention that the auxiliary frame buffer memory outputs a third signal when a medium level set between the upper level and the lower level to a predetermined amount of the stored video data is reached, and the direct memory access controller controls the main frame buffer memory so that the video data stored in the main frame buffer memory is transmitted to the auxiliary frame buffer memory until the third signal is output, whenever the first signal is output at the subsequent stage.

Also, it is preferred in the present invention that the direct memory access controller controls the main frame buffer memory so that the video data stored in the main frame buffer memory is transmitted to the auxiliary frame buffer memory until the second signal is output, whenever the first signal is output at the subsequent stage.

Also, it is preferred in the present invention that the print start signal is generated from the engine and output to the direct memory access controller through the video sync signal controller, and that a print stop signal is generated from the engine and output to the direct memory access controller through the video sync signal controller, and the direct memory access controls the main frame buffer memory, when the print stop signal is received, so that the transmission of video data from the main frame buffer memory to the auxiliary frame buffer memory is interrupted.

Also, it is preferred in the present invention that the image forming apparatus further comprises a video data output controller for temporarily storing video data output from the auxiliary frame buffer memory and outputting the video data to the engine according to the video clock sync signal.

To achieve another aspect of the present invention, there is provided a method of transmitting video data of an image forming apparatus including an engine for forming an image corresponding to received video data on a sheet of paper, a main frame buffer memory, and an auxiliary frame buffer memory for outputting stored video data along a data transmission path to the engine according to a video clock sync signal and outputting the information of the amount of video data stored. The method further comprises a central processing unit for converting print data received externally to video data suitable for driving of the engine and storing the converted video data in the main frame buffer memory, a direct memory access controller for controlling the main frame buffer memory so that video data stored in the main frame buffer memory is transmitted to the auxiliary frame buffer memory by using the information of the amount of video data stored from the auxiliary frame buffer memory, and a video sync signal controller for controlling operation and interruption of the direct memory access controller according to a video data output control signal output from the engine and outputting the video clock sync signal. The method comprising the steps of (A) determining whether a print start signal is input, (B) if the print start signal is determined to be input, transmitting video data from the main frame buffer memory to the auxiliary frame buffer memory, (C) determining whether the amount of video data stored in the auxiliary frame buffer memory reaches a set upper level, (D) if it is determined that the set upper level is reached, interrupting the transmission of video data from the main frame buffer memory to the auxiliary frame buffer memory, (E) determining whether the amount of video data stored in the auxiliary frame buffer memory reaches a lower level which is set to a state that some amount of video data is left as the video data is transmitted to the engine, and (F) if it is determined that the set lower level is reached, transmitting a set amount of video data from the main frame buffer memory to the auxiliary frame buffer memory.

Also, it is preferred in the present invention that, if it is determined that the amount of video data stored in the auxiliary frame buffer memory reached the set lower level, transmitting the video data from the main frame buffer memory to the auxiliary frame buffer memory until the amount of the video data stored in the auxiliary frame buffer memory reaches a medium level set between the upper level and the lower level as a predetermined data amount is reached.

Also, it is preferred in the present invention that the method further comprises a step (G) of repeating the steps (E) and (F) until a print stop signal is input.

BRIEF DESCRIPTION OF THE DRAWINGS

The above objective and advantages of the present invention will become more apparent by describing in detail a preferred embodiment thereof with reference to the attached drawings in which:

FIG. 6 is a flowchart for explaining a process of transmitting video data using the image forming apparatus of FIG. 3.

DETAILED DESCRIPTION OF THE INVENTION

Figure 1:
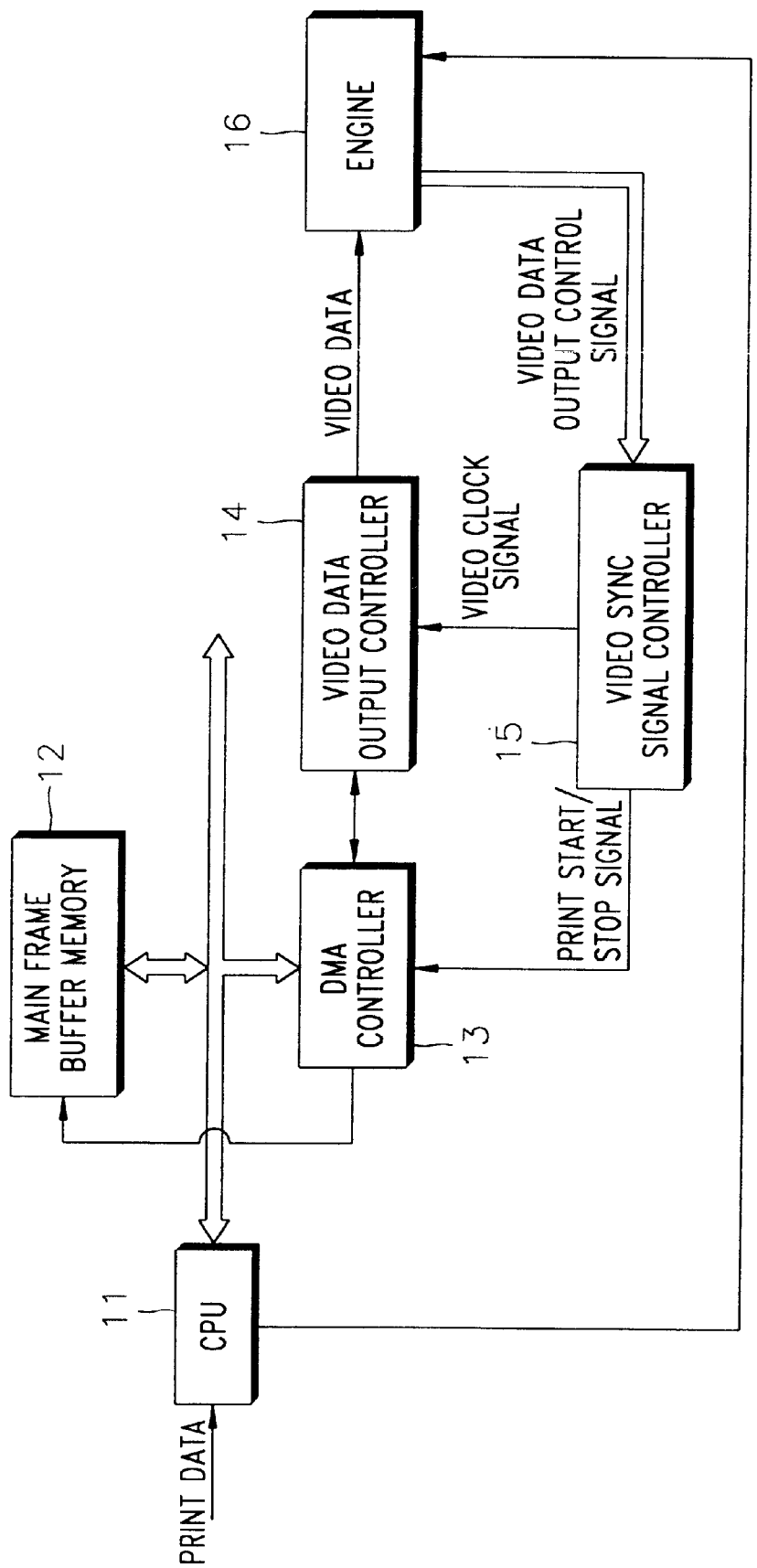
FIG. 1 is a block diagram showing a conventional image forming apparatus.
Figure 2:
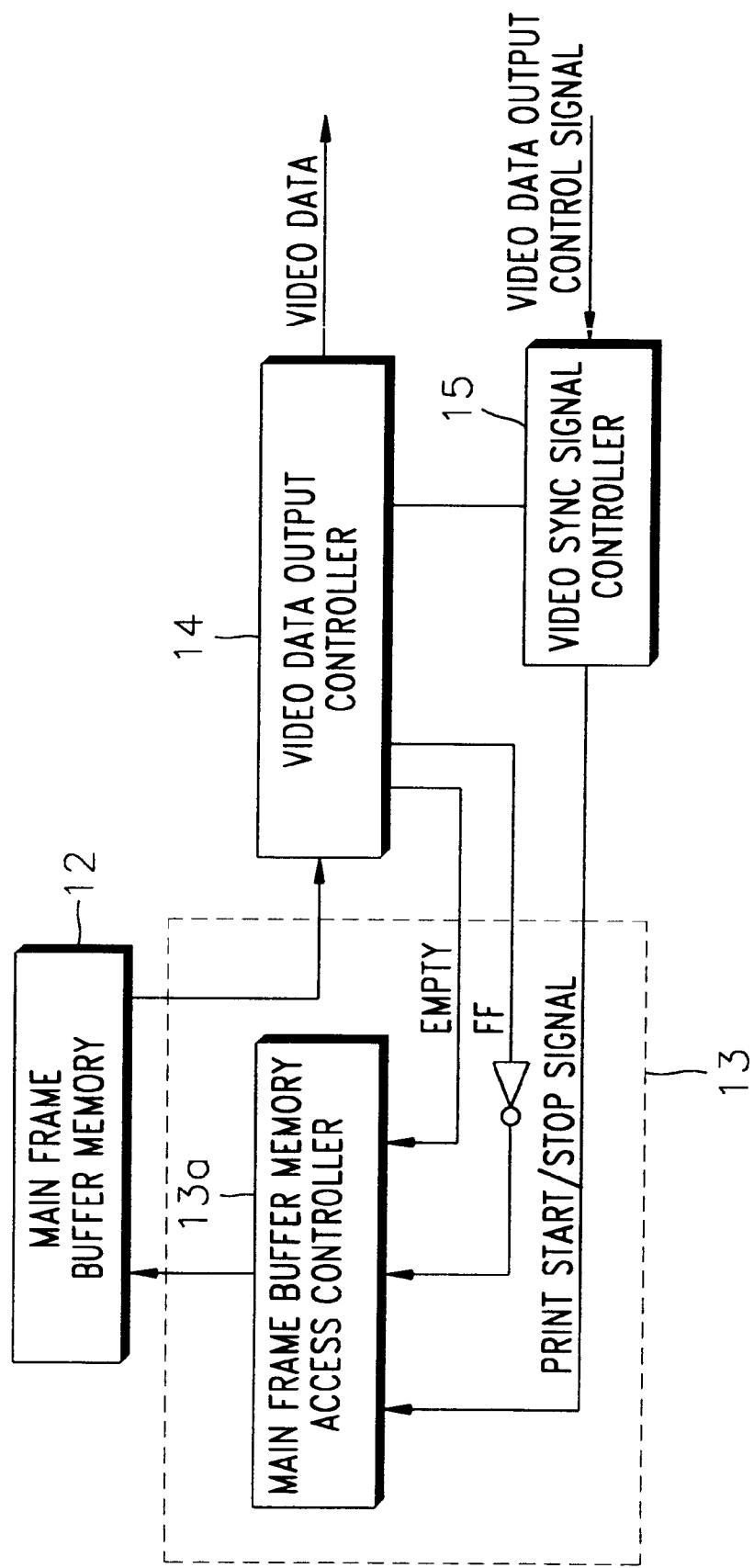
FIG. 2 is a block diagram showing part of the blocks of FIG. 1 for explanation of the conventional video data transmitting method.
Figure 3:
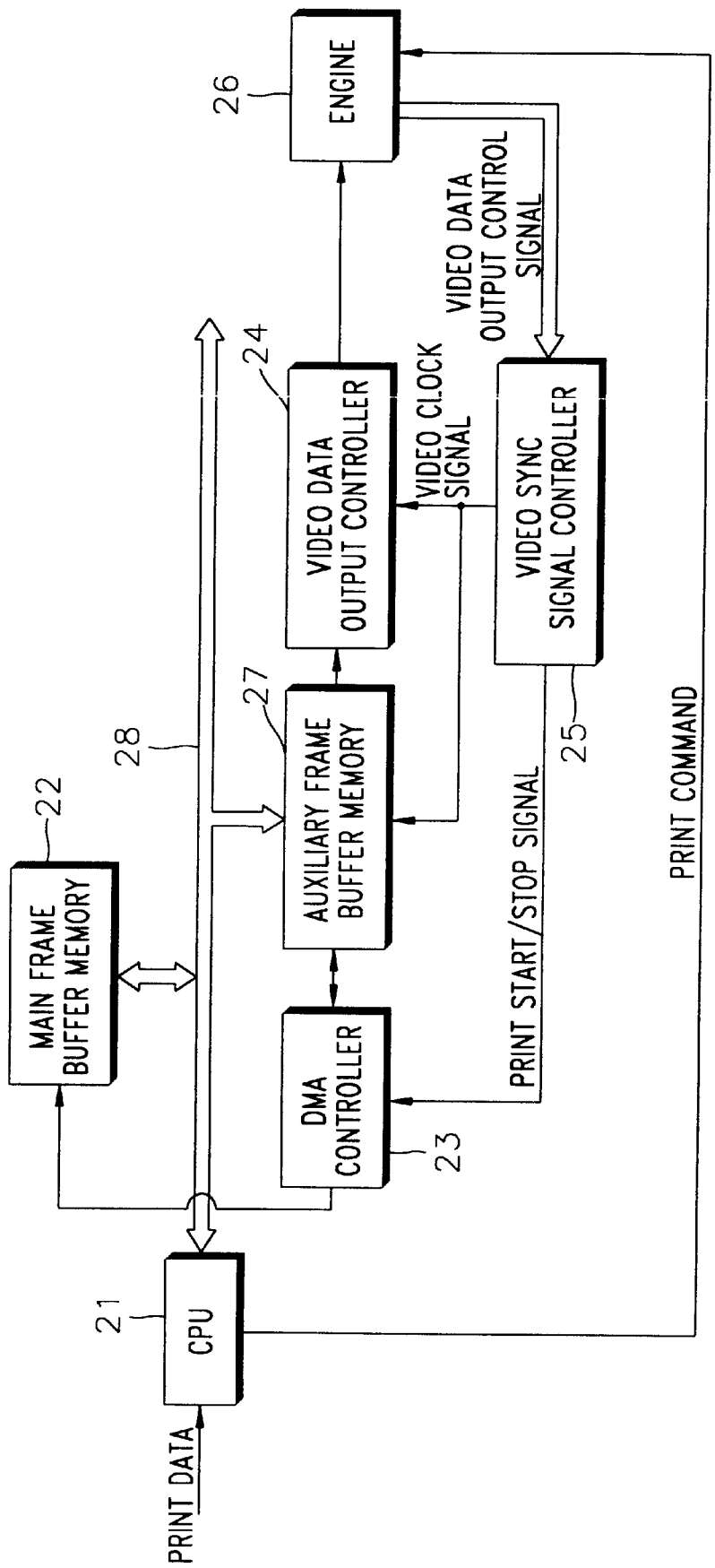
FIG. 3 is a block diagram showing an image forming apparatus according to the present invention.

Referring to FIG. 3, an image forming apparatus according to the present invention includes a central processing unit (CPU) 21, a main frame buffer memory 22, an auxiliary frame buffer memory 27, a direct memory access (DMA) controller 23, a video data output controller 24, a video sync signal controller 25, and an engine 26. Reference numeral 28 denotes a bus which is a passage for data transmission.

The CPU 21 converts print data received from the outside to video data suitable for driving the engine 26 and stores the converted video data in the main frame buffer memory 22.

The engine 26 is configure to output an image corresponding to received video data by printing the same on a sheet of paper and may have various structures according to the type of configuration. The engine 26 which is an electrophotographic engine includes a photoreceptor medium, a laser scanning unit for selectively scanning light onto the photoreceptor medium to form an electrostatic latent image, a development unit for developing the electrostatic latent image with development material, a transfer unit for transferring the developed electrostatic latent image to a sheet of paper, and a paper feeding unit for supplying the paper to the transfer unit.

Figure 5:
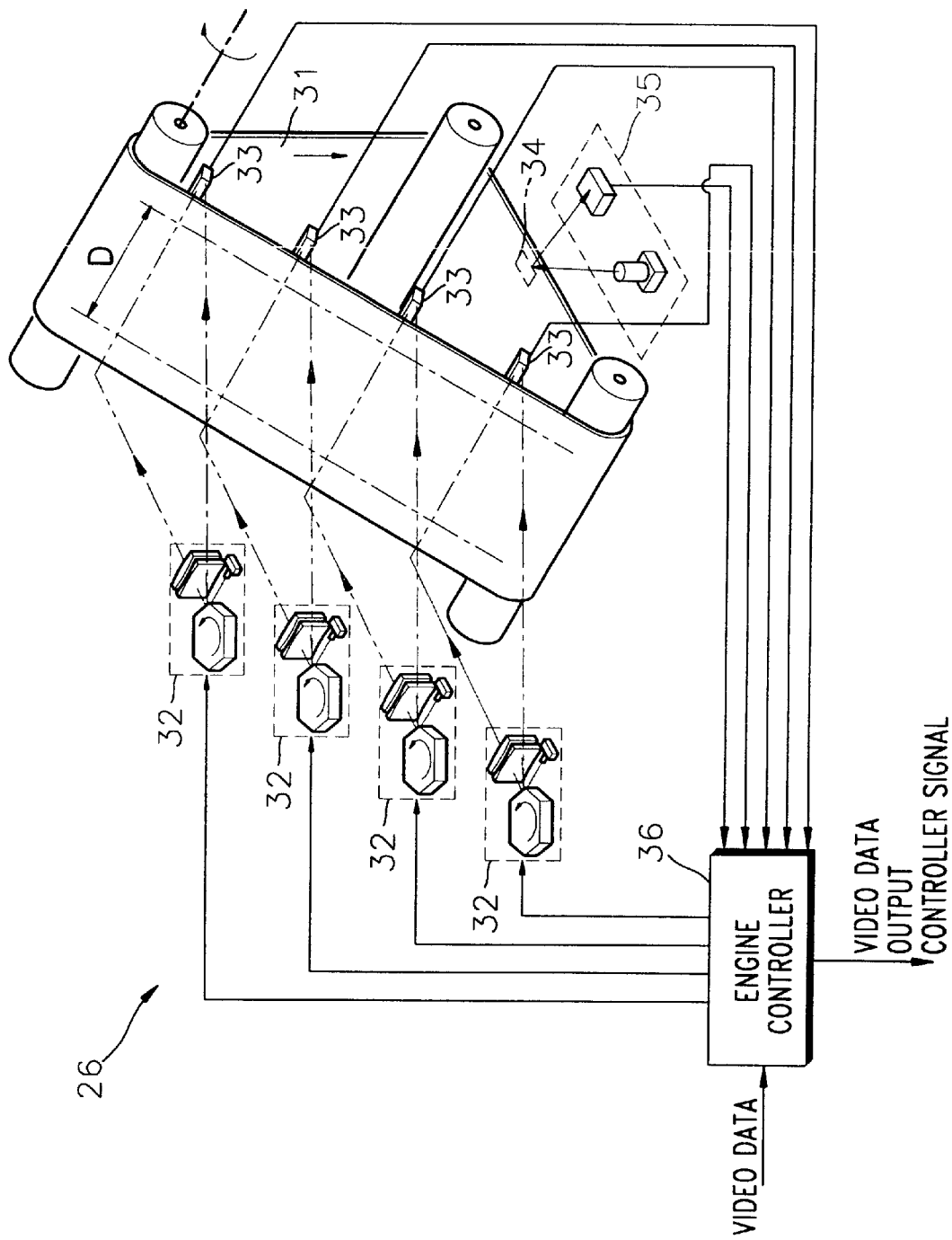
FIG. 5 is a perspective view showing a part of the engine of FIG. 3.

FIG. 5 shows a part of the engine 26. Referring to the drawing, the electrophotographic engine 26 includes a plurality of laser scanning units 32 for scanning light to a circulating photoreceptor web 31 which is a photoreceptor medium, a plurality of photodetectors 33, installed near the edge of one side of the photoreceptor web 31, for receiving light scanning out of the edge of the photoreceptor web 31, a mark detecting sensor 35 for detecting passing of a mark 34 formed on the photoreceptor web 31 to check the position of the circulating photoreceptor web 31, and an engine controller 36 for controlling the laser scanning units 32 to form an image corresponding to the received video data on the photoreceptor web 31 using an output signal of the mark detecting sensor 35 and an output signal of the respective photodetectors 33, and for outputting a video data output control signal including a video clock sync signal, a print start signal and a print stop signal. The engine controller 36 controls each units constituting the engine 26, that is, the development unit, the transfer unit and the paper feeding unit which are not shown in FIG. 5.

When receiving a print command from the CPU 21, the engine 26 prepares each of the units constituting the engine 26 for performing a print task. When it is determined that performing the print task is possible, the engine 26 outputs a print start signal to the video sync signal controller 25. The engine 26 receives information on the paper size and the page number corresponding to the video data to be printed from the CPU 21. When it is time to write video data corresponding to one page to a photoreceptor medium, the engine 26 outputs the print start signal. The engine 26 outputs a video clock sync signal after the print start signal is output. After the writing of the video data corresponding to one page to the photoreceptor medium is completed, the engine 26 outputs a print stop signal. Then, the engine 26 outputs the print start signal again when it is time to write video data of the next page at a predetermined interval. The video clock sync signal is output from a video clock generator (not shown) provided inside the engine 26 for recording video data on the photoreceptor medium according to the position of a pixel.

In the operation of the engine 26, referring to FIG. 5, when a signal indicating the passing of the mark 34 is received from the mark detecting sensor 35, the engine 26 outputs after a predetermined time the print start signal indicating that writing of an image corresponding to one page begins. Then, when a light receiving signal is output from the photodetector 33 corresponding to the received of light scanned by the laser scanning unit 32, the engine 26 outputs the video clock sync signal set corresponding to the time for emitting light corresponding to video data to the position of a pixel set along a scanning line after a predetermined time needed for the laser scanning unit 32 to scan light to an image writing area D set at the central portion of the photoreceptor web 31. The engine 26 internally counts the number of scanning lines written to the photoreceptor web 31 corresponding to the video data according to the number of light receiving signals from the photodetector 33, the number of rotations of a motor (not shown) driving the photoreceptor web 31, or in other methods. When the number of counted scanning lines corresponds to one page of a sheet of paper to be used for print, the engine 26 outputs the print stop signal.

The auxiliary frame buffer memory 27 stores video data transmitted from the main frame buffer memory 22 and outputs the stored video data to the video data output controller 24 in order by synchronizing the video data with the video clock sync signal output from the engine 26 via the video sync signal controller 25. The auxiliary frame buffer memory 27 outputs a first signal when the stored video data reaches a predetermined amount, for example, a lower level set corresponding to about half or ⅓ of the storage capacity, and a second signal when the stored video data reaches a set upper level. Also, the auxiliary frame buffer memory 27 preferably output a third signal when the stored video data reaches a medium level corresponding to a predetermined data storage amount set between the upper and lower levels. As the auxiliary frame buffer memory 27, a memory having a storage capacity less than the amount of video data written to a sheet of paper of the maximum size possibly supplied to the engine 26, for example, an amount of video data corresponding to two or three scanning lines, is adopted.

The DMA controller 23, at an initial stage, controls the main frame buffer memory 22 such that the video data stored in the main frame buffer memory 22 is output to the auxiliary frame buffer memory 27 until the second signal is output from the auxiliary frame buffer memory 27. Then, when the second signal is output from the auxiliary frame buffer memory 27, the DMA controller 23 controls the main frame buffer memory 22 so that the data transmission from the main frame buffer memory 22 to the auxiliary frame buffer memory 27 is interrupted and a subsequent step is performed. In the subsequent step, whenever the first signal is output from the auxiliary frame buffer memory 27, the DMA controller 23 controls the main frame buffer memory 22 such that a set amount of video data can be transmitted from the main frame buffer memory 22 to the auxiliary frame buffer memory 27. The amount of video data set to be transmitted from the main frame buffer memory 22 to the auxiliary frame buffer memory 27 whenever the first signal is output in the subsequent step may be set to an amount of data until the second signal is output or the third signal is output.

Figure 4:
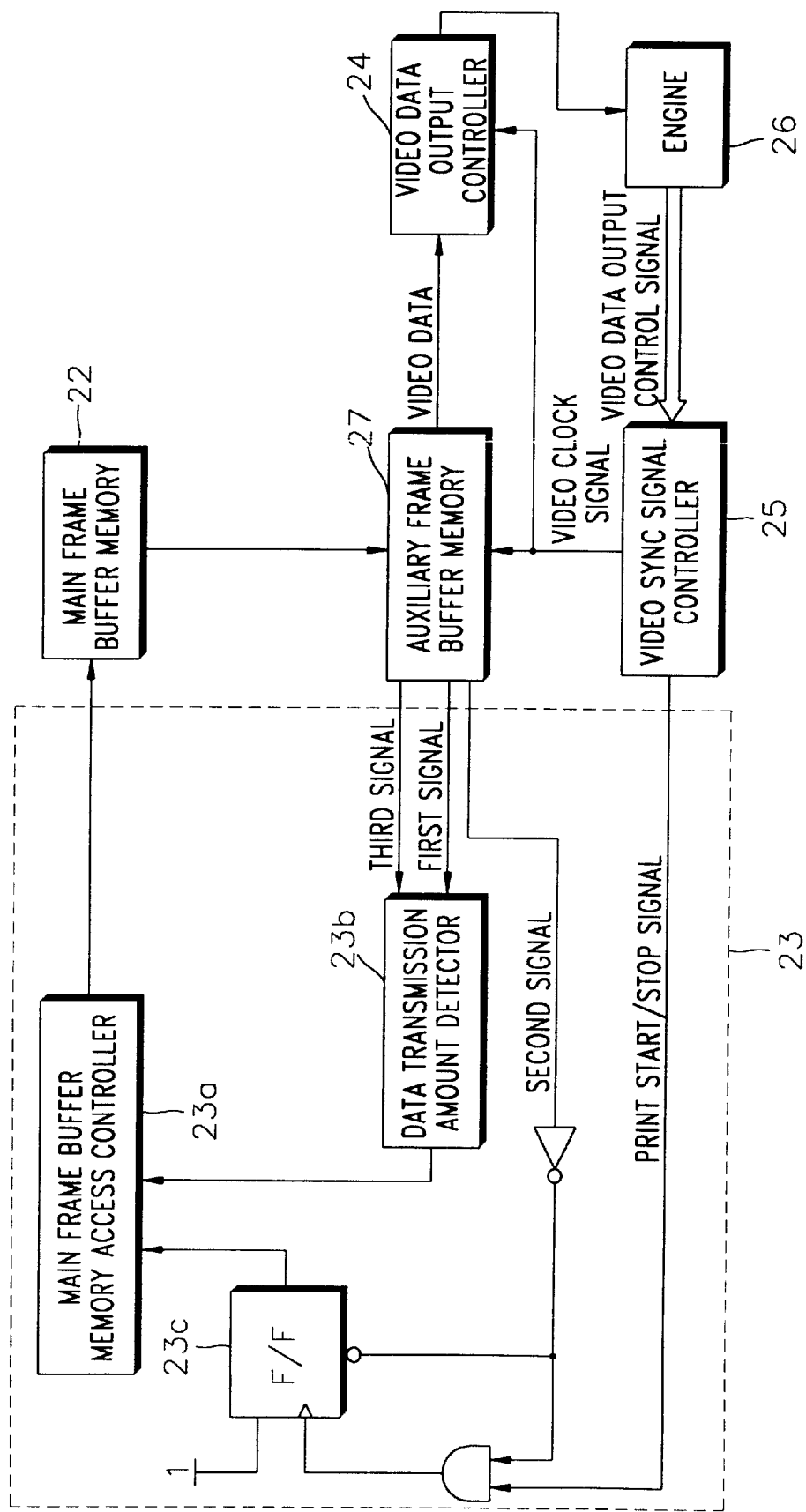
FIG. 4 is a block diagram showing a part of the blocks of FIG. 3 in detail.

FIG. 4 shows the structure of the DMA controller 23 operating as described above. In the example shown in FIG. 4, a main frame buffer memory access controller 23a of the DMA controller 23, at the above-described subsequent step, controls the main frame buffer memory 22 such that the video data stored in the main frame buffer memory 22 to the auxiliary frame buffer memory 27 until the third signal is input whenever the first signal is input.

A data transmission amount detector 23b reads the signal (first or third signal) output from the auxiliary frame buffer memory 27 and transmits the read signal to the main frame buffer memory access controller 23a. Thus, in the subsequent step, the main frame buffer memory access controller 23a controls the main frame buffer memory 22 using the signal output from the data transmission amount detector 23b.

A logic circuit is configured such that an initializing signal at the initial stage from a flip-flop circuit 23c can be input to the main frame buffer memory access controller 23a until the second signal indicating that the auxiliary frame buffer memory 27 is filed with the video data to the set upper level is input after the print start signal is output from the video sync signal controller 25. While the initializing signal is maintained at the flip-flop circuit 23c, the main frame buffer memory access controller 23a performs the initial step. The logic value of the print stop signal is generated to be opposite to that of the print start signal.

Thus, when the print start signal is output from the engine 26, the video data stored in the main frame buffer memory 22 is input to the auxiliary frame buffer memory 27. When the second signal is output from the auxiliary frame buffer memory 27, the transmission of data from the main frame buffer memory 22 to the auxiliary frame buffer memory 27 is interrupted so that the initial step is completed. Thereafter, as a subsequent step, the main frame buffer memory access controller 23a controls the main frame buffer memory 22 so that the video data is transmitted at every time until the third signal is output from the auxiliary frame buffer memory 27. In addition to the above-described method, various other methods may be employed for the configuration of the logic circuit of the DMA controller 23 operating as above.

Unlike the above, when the amount of video data to be transmitted from the main frame buffer memory 22 to the auxiliary frame buffer memory 27 is set to the amount of video data to be transmitted until the second signal is output, whenever the first signal is output in the subsequent stage, the DMA controller 23 is configured such that the first signal is directly input to the main frame buffer memory access controller 23a while omitting the data transmission amount detector 23b.

The video data output controller 24 temporarily stores the video data received from the main frame buffer memory 22 via the auxiliary frame buffer memory 27 and outputs the stored video data to the engine 26 by being controlled by the video sync signal controller 25. The video sync signal controller 25 controls the operation and interruption of the DMA controller 23, and the video output time of the auxiliary frame buffer memory 27 and the video data output controller 24 according to the video data output control signal output from the engine 26. The video data output controller 24 outputs the video data to the engine 26 by synchronizing the same with the video clock sync signal output from the video sync signal controller 25.

In a method of transmitting the video data of an image forming apparatus according to the present invention, referring to FIG. 6, the DMA controller 23 determines whether a print start signal is input (step 110). When the print start signal is determined to be input, video data is transmitted from the main frame buffer memory 22 to the auxiliary frame buffer memory 27 (step 120).

During the step 120, whether a second signal is output from the auxiliary frame buffer memory 27 is determined (step 130). Also, when a video clock signal is output from the video sync signal controller 25 during the steps 120 and 130, the video data stored in the auxiliary frame buffer memory 27 is output to the video data output controller 24. The video data output controller 24 outputs the received video data to the engine 26 by synchronizing the same with the video clock signal. The engine 26 controls the laser scanning unit 32 to form an image corresponding to the received video data on the photoreceptor web 31, and controls the development unit and the paper feeding unit so that an electrostatic latent image formed on the photoreceptor web 31 is transferred to a sheet of paper and the paper is discharged.

When the second signal indicating that the amount of video data stored in the auxiliary frame buffer memory 27 reaches the set upper level is determined to be output in the step 130, the transmission of the video data from the main frame buffer memory 22 to the auxiliary frame buffer memory 27 is interrupted (step 140). An initial step ends when the step 140 is completed.

When the subsequent steps are initiated after the initial step is completed, the amount of video data stored in the auxiliary frame buffer memory 27 gradually decreases as the video data is output to the engine 26 according to the video clock sync signal.

It is determined whether the video data stored in the auxiliary frame buffer memory 27 reaches the set lower level, that is, the first signal is generated (step 150). When the first signal is determined to be output from the auxiliary frame buffer memory 27 in step 150, the transmission of video data from the main frame buffer memory 22 to the auxiliary frame buffer memory 27 is performed again (step 160). It is determined whether the video data corresponding to a set data transmission amount is transmitted from the main frame buffer memory to the auxiliary frame buffer memory 27 during the subsequent step (step 170). Here, in the subsequent step, the set data transmission amount may be either the amount corresponding to a difference value between the first signal and the second signal or the amount corresponding to a difference value between the first signal and the third value as described above.

When it is determined in step 170 that the set data transmission amount is reached, the transmission of video data from the main frame buffer memory 22 to the auxiliary frame buffer memory 27 is interrupted (step 180). Then, it is determined whether a print stop signal is input (step 190). When the print stop signal is determined to be input in step 190, the step 1 10 is performed. Otherwise, the step 150 is performed. Consequently, steps 150 through 180 are repeated while no print stop signal is input.

In the above process of video data transmission to the engine 26, as the video data can be continuously output to the engine 26 according to the video clock signal until the print stop signal is input from the engine 26, speed of print can be increased. Also, it is sufficient that the auxiliary frame buffer memory 27 has a storage capacity less than the amount of video data written to a sheet of paper of the maximum size possibly supplied to the engine 26, for example, an amount of the video data corresponding to two or three scanning lines.

As described above, according to the image forming apparatus and a method of transmitting video data therefor according to the present invention, as the video data can be continuously output to the engine in synchronization with the video clock signal until the print stop signal is generated; speed of print can be increased. Also, a large capacity of storing video data for a memory for video data transmission is not needed.

What is claimed is:

1. An image forming apparatus comprising:
   an engine for forming an image corresponding to received video data on a sheet of paper;
   a main frame buffer memory;
   an auxiliary frame buffer memory for outputting stored video data along a data transmission path to said engine according to a video clock sync signal, and outputting a first signal when said stored video data reaches a predetermined lower level and a second signal when said stored data reaches a predetermined upper level;
   a central processing unit for converting received print data to video data to drive said engine and storing the converted video data in said main frame buffer memory;
   a direct memory access controller for controlling said main frame buffer memory to transmit predetermined video data stored in said main frame buffer memory to said auxiliary frame buffer memory until said second signal is received, at an initial stage, and until said first signal is received, at a subsequent stage after said initial stage, according to a print start signal; and
   a video sync signal controller for controlling operation and interruption of said direct memory access controller according to a video data output control signal output from said engine and outputting said video clock sync signal.

2. The apparatus as claimed in claim 1, wherein said auxiliary frame buffer memory outputs a third signal when said stored video data reaches a medium level set between said upper level and said lower level, and said direct memory access controller controls said main frame buffer memory to transmit said video data stored in said main frame buffer memory to said auxiliary frame buffer memory until said third signal is received, whenever said first signal is received at said subsequent stage.

3. The apparatus as claimed in claim 1, wherein said direct memory access controller controls said main frame buffer memory to transmit said video data stored in said main frame buffer memory to said auxiliary frame buffer memory until said second signal is received, whenever said first signal is received at said subsequent stage.

4. The apparatus as claimed in claim 1, wherein said print start signal is generated from said engine and received by said direct memory access controller from said video sync signal controller.

5. The apparatus as claimed in claim 1, wherein a print stop signal is generated from said engine and received by said direct memory access controller from said video sync signal controller, and said direct memory access controller controls said main frame buffer memory when said print stop signal is received to interrupt the transmission of video data from said main frame buffer memory to said auxiliary frame buffer memory.

6. The apparatus as claimed in claim 1, further comprising a video data output controller for temporarily storing video data output from said auxiliary frame buffer memory and outputting said video data to said engine according to said video clock sync signal.

7. The apparatus as claimed in claim 1, wherein said auxiliary frame buffer memory has a storage capacity less than a maximum amount of video data written to a sheet of paper supplied to said engine.

8. The apparatus as claimed in claim 1, wherein said video sync signal controller receives said video clock sync signal from said engine.

9. A method of transmitting video data of an image forming apparatus including an engine for forming an image corresponding to received video data on a sheet of paper, a main frame buffer memory, an auxiliary frame buffer memory for outputting stored video data along a data transmission path to said engine according to a video clock sync signal and outputting information of the amount of video data stored, a central processing unit for converting received print data to video data to drive said engine and storing the converted video data in said main frame buffer memory, a direct memory access controller for controlling said main frame buffer memory to transmit predetermined video data stored in said main frame buffer memory to said auxiliary frame buffer memory by using said information on said amount of video data stored in said auxiliary frame buffer memory, and a video sync signal controller for controlling operation and interruption of said direct memory access controller according to a video data output control signal output from said engine and outputting said video clock sync signal, said method comprising said steps of:

(A) determining whether a print start signal is received;

(B) if said print start signal is received, transmitting video data from said main frame buffer memory to said auxiliary frame buffer memory;

(C) determining whether said amount of video data stored in said auxiliary frame buffer memory reaches a predetermined upper level;

(D) if it is determined in said step (C) that said predetermined upper level is reached, interrupting said transmission of video data from said main frame buffer memory to said auxiliary frame buffer memory;

(E) determining whether said amount of video data stored in said auxiliary frame buffer memory reaches a predetermined lower level, which is set to a state that some amount of video data is left as said video data is transmitted to said engine; and (F) if it is determined in said step (E) that said predetermined set lower level is reached, transmitting a predetermined amount of video data from said main frame buffer memory to said auxiliary frame buffer memory.

10. The method as claimed in claim 9, wherein, if it is determined in said step (F) that said amount of video data stored in said auxiliary frame buffer memory reaches said predetermined lower level, transmitting said video data from said main frame buffer memory to said auxiliary frame buffer memory until said amount of said stored video data reaches said upper level.

11. The method as claimed in claim 9, wherein, if it is determined in said step (F) that said amount of video data stored in said auxiliary frame buffer memory reaches said predetermined lower level, transmitting said video data from said main frame buffer memory to said auxiliary frame buffer memory until said amount of video data stored in said auxiliary frame buffer memory reaches a medium level set between said upper level and said lower level.

12. The method as claimed in claim 11, further comprising a step (G) of repeating said steps (E) and (F) until a print stop signal is received.

* * * * *